(12) United States Patent
Paluri

(10) Patent No.: US 10,931,854 B2
(45) Date of Patent: Feb. 23, 2021

(54) AGGREGATING VIDEO STREAMS FROM CAMERAS BASED ON SOCIAL CONNECTIONS IN AN ONLINE SYSTEM

(71) Applicant: Facebook, Inc., Menlo Park, CA (US)

(72) Inventor: Balmanohar Paluri, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/162,069

(22) Filed: Oct. 16, 2018

(65) Prior Publication Data

US 2019/0132492 A1    May 2, 2019

Related U.S. Application Data

(63) Continuation-in-part of application No. 15/794,320, filed on Oct. 26, 2017, now abandoned.

(51) Int. Cl.
| | |
|---|---|
| H04N 21/218 | (2011.01) |
| H04N 21/231 | (2011.01) |
| H04N 21/239 | (2011.01) |
| H04N 21/242 | (2011.01) |
| H04N 21/25 | (2011.01) |
| H04N 21/43 | (2011.01) |
| H04N 21/442 | (2011.01) |
| H04N 5/073 | (2006.01) |
| H04N 5/341 | (2011.01) |

(Continued)

(52) U.S. Cl.
CPC ............ *H04N 5/073* (2013.01); *G06Q 50/01* (2013.01); *H04N 5/3415* (2013.01); *H04N 21/21805* (2013.01); *H04N 21/4788* (2013.01)

(58) Field of Classification Search
None
See application file for complete search history.

(56) References Cited

U.S. PATENT DOCUMENTS

| | | |
|---|---|---|
| 8,612,517 B1 | 12/2013 | Yadid et al. |
| 2008/0060034 A1 | 3/2008 | Egnal et al. |

(Continued)

OTHER PUBLICATIONS

United States Office Action, U.S. Appl. No. 15/794,320, dated Oct. 12, 2018, 18 pages.

(Continued)

*Primary Examiner* — Brian T Pendleton
*Assistant Examiner* — Jena D Saint Cyr
(74) *Attorney, Agent, or Firm* — Fenwick & West LLP

(57) ABSTRACT

An online system maintains connections among users of that system and allows them to share media information with one another. If multiple socially connected users are viewing the same event and are located in the vicinity of one another, a social camera application executing on each client device of the socially connected users allows these users to capture media information of that event, and a higher quality media content of the event can be generated from the multiple captures of the event. For example, a target user begins a social camera experience and invites other socially connected users in the vicinity to join that experience. These users upload their captures of the event to the online system, which are combined to create a social camera media item of the event with better quality than any of the individual captures taken by a user within the group.

20 Claims, 5 Drawing Sheets

(51) Int. Cl.
*G06Q 50/00* (2012.01)
*H04N 21/4788* (2011.01)

(56) References Cited

U.S. PATENT DOCUMENTS

| | | | |
|---|---|---|---|
| 2009/0087161 A1* | 4/2009 | Roberts | H04N 21/8549 386/282 |
| 2010/0289900 A1 | 11/2010 | Ortiz | |
| 2014/0046802 A1* | 2/2014 | Hosein | G06Q 30/06 705/26.61 |
| 2015/0067543 A1* | 3/2015 | Mo | H04W 4/21 715/756 |
| 2015/0124107 A1* | 5/2015 | Muriello | H04N 5/23229 348/207.1 |
| 2015/0310188 A1* | 10/2015 | Ford | H04L 63/0428 726/28 |
| 2015/0331942 A1 | 11/2015 | Tan | |
| 2016/0014435 A1* | 1/2016 | Cronin | H04N 5/247 725/82 |
| 2016/0345035 A1 | 11/2016 | Han et al. | |
| 2017/0201779 A1* | 7/2017 | Publicover | H04N 21/2668 |
| 2018/0159913 A1* | 6/2018 | Barnett | H04W 4/08 |

OTHER PUBLICATIONS

PCT International Search Report and Written Opinion, PCT Application No. PCT/US2018/056256, dated Feb. 14, 2019, eighteen pages.

\* cited by examiner

AGGREGATING VIDEO STREAMS FROM CAMERAS BASED ON SOCIAL CONNECTIONS IN AN ONLINE SYSTEM

CROSS REFERENCE TO RELATED APPLICATION

This application is a continuation-in-part of U.S. patent application Ser. No. 15/794,320, filed on Oct. 26, 2017, which is incorporated by reference in its entirety.

BACKGROUND

This invention relates generally to digital content, and in particular to creating a high quality video stream of an event by combining multiple video streams of the event captured by cameras associated with a group of socially connected users of an online system.

Users of online systems, such as social networking systems, capture media content of an event (e.g., a live concert) as photo and video data using mobile devices and share that content with other users of the online systems. In many cases, multiple connected online system users will attempt to capture the same event on their mobile devices. However, each individual user's mobile device is only able to capture a limited view of the event from each user's seat/location in the venue of the even. In addition, each individual user's device may be limited by the device's capabilities (e.g., video frame rates, zoom levels, or resolutions of the mobile phone's camera). For example, a given user's video of a concert will be shot from one angle for a camera of that user's phone and will only have limited spatial information of the concert provided by the captured video. The quality of the video will be limited by the resolution of the camera of the client device used by an individual user and the frame rate will be limited based on the specifications of the camera of the client device.

SUMMARY

An online system, such as a social networking system, maintains a social graph of objects that are connected to other objects within the online system. The social graph of objects is used to store connections such as relationships between users and connections between a user and a camera used by the user. The online system may provide a social camera application for users to cooperatively create media content. In connection with such media content creation, the online system maintains and enforces one or more privacy settings for users in various embodiment so that data sharing among users are based on users' informed authorization. For example, the online system may maintain a default privacy setting preventing the application from sharing or uploading any data or information to the online system or to other users. The default privacy setting may control any captured video data, audio data, image data, or other data so that the users may select whether to allow their camera and/or mobile devices to share information with the online system and/or any other users and also select with whom their data and information should be shared. The various privacy settings also allow a user to control the storage of any user-related or user-generated data and to delete any data previously stored. In connection with the use of the social camera application, users may affirmatively authorize (e.g., based on user's selection in the privacy setting, in response to a prompted dialogue that asks for user's selection of authorization or rejection, and/or via any other suitable ways) the use of social camera application to perform various features described herein.

Subject to these privacy settings and data sharing authorization, a social camera (also known as "combined camera" herein) application executing on a client device of a user of the online system detects when multiple socially connected users are using their camera near each other, and invokes a social functionality of the social camera application that coordinates the use of the multiple cameras to generate high quality media contents.

In one embodiment, the social camera application is executed on a client device of a user who is socially connected to a group of other users of the online system. Based on the authorization of other connected users, the social camera application on the user's client device instructs cameras of the other connected users' client devices capturing the same event to capture the event at different focal depths or zoom levels. This increases the total information of the captured event by the aggregate of the multiple cameras. The online system combines multiple video streams of the event captured by the multiple cameras of the socially connected users into a video stream that is higher quality than any individual video stream captured by an individual camera of a user of the group. Each user of the group of socially connected users can have access to the higher quality video stream of the event.

In one embodiment, the high quality video stream of an event generated based on the multiple captures of the event by the aggregate of the multiple cameras is referred to as "social camera media content" or "combined camera media content." The social camera media content can be stored as a media file describing media content of a media event. If this media file is about image, it may be a panorama or 360-degree view of a scene described by the image. It could be filtered to allow for the best possible resolution based on multiple images describing the same scene, which were taken by multiple cameras of the users of the online system. If the medium of the captured event is video, a high quality video stream can be generated from the plurality of video streams captured by each user's camera on each user's client device. The generated video stream has better quality than a video stream captured by an individual camera in terms seamless transition between the different views, reduced or absence of video content noises, such as jitter or other visual artifacts in video frames of the generated video stream. For example, a social camera module of the online system can remove the effects of a user who had a shaky hand while filming the scene.

An individual or single camera on a user's client device captures a scene from only the user's perspective. The media captured is limited by the specifications of the particular camera on the client device. A social camera which includes multiple of cameras of a group of users who opt to capture a scene or an event together can mitigate many of the limitations the individual client-device camera faces. A social camera module of the online system communicates with the social camera software modules on the multiple users' client devices and generates a high quality video stream based on the videos streams captured by the multiple cameras of the multiple users. The social camera module receives a request from a user of the online system to provide that user with social camera media content of a media event such as a live concert, and determines an identification of the user's client device as well as the identity of the user on the online system. This user is designated to be a target user of the social camera media content. Additional nearby users of the online system are also identified and located. The target user can then decide to invite these additional users to form a group to create a social camera media content item of the event. When one or more of these users decide to capture an event, the social camera module receives the captured data of the event from the cameras of the additional nearby users.

After the captured data has been received from one or more users of the group, the social camera module synchronizes the media data to generate the high quality video stream of the event and provides the generated video stream as the social camera media content to the target user and one or more additional nearby users. In one embodiment, the synchronization of the media data is temporal synchronization, which is obtained by analyzing time stamps from each capture of the media event. The synchronized media data is combined into one media file and provided to the target user, who can then view it and share it with other socially connected users of the group.

Embodiments according to the invention are in particular disclosed in the attached claims directed to a method and a storage medium, wherein any feature mentioned in one claim category, e.g. method, can be claimed in another claim category, e.g. storage medium, system, and computer program product, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment according to the invention, a computer-implemented method may comprise:
receiving a request for social camera media content of an event from a requesting user of an online system;
identifying a plurality of client devices associated with a plurality of other users who are in vicinity of the requesting user and are socially connected to the requesting user within the online system;
inviting the identified other users to capture the event concurrently with the requesting user;
receiving a plurality of captured media content of the event from the plurality of identified other users and the requesting user, each captured media content of the event representing a single view of the event;
synchronizing the captured media content of the event based on at least timing information of the captured media content;
combining the synchronized media content of the event to generate a social camera media content item of the event, the social camera media content item of the event representing a comprehensive view of the event; and
providing the generated social media content item to the requesting user.

In an embodiment according to the invention, a method may comprise:
determining the identity of the requesting user and the identifies of the plurality of identified other users based on corresponding user profiles of the requesting user and the plurality of identified other users within the online system; and
determining whether each of the plurality of identified other users is socially connected with the requesting user based on the determined identities.

Synchronizing the captured media content of the event may comprise:
comparing the timing information of each captured media content; and
selecting a starting time and ending time for the social camera media content item based on the comparison of the timing information.

In an embodiment according to the invention, a method may comprise:
identifying one or more capture media content of the event that do not overlap with at least one another capture media content of the event; and
removing the identified one or more captured media content of the event from the generation of the social camera media content item of the event.

Combining the synchronized media content of the event may comprise:
identifying one or more visual artifact in a video frame of each captured media content of the event; and
removing the identified visual artifact in the video frame.

Combining the synchronized media content of the event may comprise:
selecting a captured media content of the event from a capturing as the social camera media content item with a base visual quality; and
enhancing the base visual quality of the social camera media content item of the event with a plurality of desirable features from the other captured media content of the event.

The plurality of desirable features from the other captured media content of the event may comprise at least one of:
a high resolution of the capture media content of the event;
a dynamic range of view the capture media content of the event;
a sharp focus of the capture media content of the event;
a high frame rate of video frames of the captured media content of the event; and
a recent capture of the event.

Each of the plurality of client devices associated with the plurality of other users may have a digital camera for capturing the event; and the digital cameras of the plurality of client devices may form a social camera for the requested social camera media content of the event.

Each of the plurality of other users within vicinity of each other may be be a requesting user for the social camera content of the event.

The generated social camera content item of the event may be accessible to the plurality of the other users who has provided a capture of the event.

In an embodiment according to the invention, a non-transitory computer-readable medium may comprise computer program instructions, the computer program instructions when executed by a computer processor may cause the processor to perform the steps including:
receiving a request for social camera media content of an event from a requesting user of an online system;
identifying a plurality of client devices associated with a plurality of other users who are in vicinity of the requesting user and are socially connected to the requesting user within the online system;
inviting the identified other users to capture the event concurrently with the requesting user;

receiving a plurality of captured media content of the event from the plurality of identified other users and the requesting user, each captured media content of the event representing a single view of the event;

synchronizing the captured media content of the event based on at least timing information of the captured media content;

combining the synchronized media content of the event to generate a social camera media content item of the event, the social camera media content item of the event representing a comprehensive view of the event; and providing the generated social media content item to the requesting user.

In an embodiment according to the invention, a non-transitory computer-readable medium may comprise computer program instructions for:

determining the identity of the requesting user and the identifies of the plurality of identified other users based on corresponding user profiles of the requesting user and the plurality of identified other users within the online system; and determining whether each of the plurality of identified other users is socially connected with the requesting user based on the determined identities.

Synchronizing the captured media content of the event may comprise:

comparing the timing information of each captured media content; and selecting a starting time and ending time for the social camera media content item based on the comparison of the timing information.

In an embodiment according to the invention, a non-transitory computer-readable medium may comprise computer program instructions for:

identifying one or more capture media content of the event that do not overlap with at least one another capture media content of the event; and removing the identified one or more captured media content of the event from the generation of the social camera media content item of the event.

Combining the synchronized media content of the event may comprise:

identifying one or more visual artifact in a video frame of each captured media content of the event; and removing the identified visual artifact in the video frame;

Combining the synchronized media content of the event may comprise:

selecting a captured media content of the event from a capturing as the social camera media content item with a base visual quality; and enhancing the base visual quality of the social camera media content item of the event with a plurality of desirable features from the other captured media content of the event.

The plurality of desirable features from the other captured media content of the event may comprise at least one of:
a high resolution of the capture media content of the event;
a dynamic range of view the capture media content of the event;
a sharp focus of the capture media content of the event;
a high frame rate of video frames of the captured media content of the event; and
a recent capture of the event.

Each of the plurality of client devices associated with the plurality of other users may have a digital camera for capturing the event; and the digital cameras of the plurality of client devices may form a social camera for the requested social camera media content of the event.

Each of the plurality of other users within vicinity of each other may be a requesting user for the social camera content of the event.

The generated social camera content item of the event may be accessible to the plurality of the other users who has provided a capture of the event.

In an embodiment according to the invention, a computer-implemented method for generating a combined camera media content item from a plurality of captured media content, may comprise:

receiving a request for the combined camera media content item of an event from a requesting client device of a user of an online system;

identifying a plurality of client devices associated with a plurality of other users who are in vicinity of the requesting client device of the user;

sending a request to each client device of the identified plurality of client devices to capture the event concurrently with the requesting client device of the user;

receiving a plurality of captured media content of the event from the plurality of identified other client devices and the requesting client device of the user, each captured media content of the event representing a single view of the event;

synchronizing the received captured media content of the event based on at least timing information of the captured media content;

combining the synchronized media content of the event to generate the combined camera media content item of the event, the combined camera media content item of the event representing a comprehensive view of the event; and providing the generated combined media content item to the requesting client device of the user.

In an embodiment according to the invention a method may comprise:

determining the identity of the user of the requesting client device and the identities of the users of the plurality of identified other client devices based on corresponding user profiles of the requesting user and the plurality of identified other users within the online system; and determining whether each of the plurality of identified other users is socially connected with the user of the requesting client device based on the determined identities.

Synchronizing the captured media content of the event may comprise:

comparing the timing information of each captured media content; and selecting a starting time and ending time for the combined camera media content item based on the comparison of the timing information;

optionally, further comprising:

identifying one or more capture media content of the event that do not overlap with at least one another capture media content of the event; and removing the identified one or more captured media content of the event from the generation of the combined camera media content item of the event.

Combining the synchronized media content of the event may comprise:

identifying one or more visual artifact in a video frame of each captured media content of the event; and removing the identified visual artifact in the video frame; or replacing the identified visual artifact in the video frame.

Combining the synchronized media content of the event may comprise:

selecting a captured media content of the event from a capturing client device as the camera media content with a base visual quality; and enhancing the base visual quality of the combined camera media content item of the event with a plurality of desirable features from the other captured media content of the event; optionally, wherein the plurality of desirable features from the other captured media content of the event may comprise at least one of:

a high resolution of the captured media content of the event;

a dynamic range of view the capture media content of the event;

a sharp focus of the capture media content of the event;

a high frame rate of video frames of the captured media content of the event; and a recent capture of the event.

Each of the plurality of client devices associated with the plurality of other users may have a digital camera for capturing the event; and the digital cameras of the plurality of client devices form a combined camera for the requested combined camera media content item of the event.

Each of the plurality of other client devices within vicinity of each other may be a requesting client device of a user for the combined camera content of the event; and/or wherein the generated combined camera content item of the event may be accessible to the plurality of the other users who has provided a capture of the event; and/or wherein each of the plurality of other users may be socially connected to the user of the requesting client device within the online system.

The sending of the request to each client device of the identified plurality of client devices nay comprise, inviting users of the identified other client devices to capture the event concurrently with the requesting client device of the user.

In an embodiment according to the invention, one or more computer-readable non-transitory storage media may embody software that is operable when executed to perform a method according to the invention or any of the above mentioned embodiments.

In an embodiment according to the invention, a system may comprise: one or more processors; and at least one memory coupled to the processors and comprising instructions executable by the processors, the processors operable when executing the instructions to perform a method according to the invention or any of the above mentioned embodiments.

In an embodiment according to the invention, a computer program product, preferably comprising a computer-readable non-transitory storage media, may be operable when executed on a data processing system to perform a method according to the invention or any of the above mentioned embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
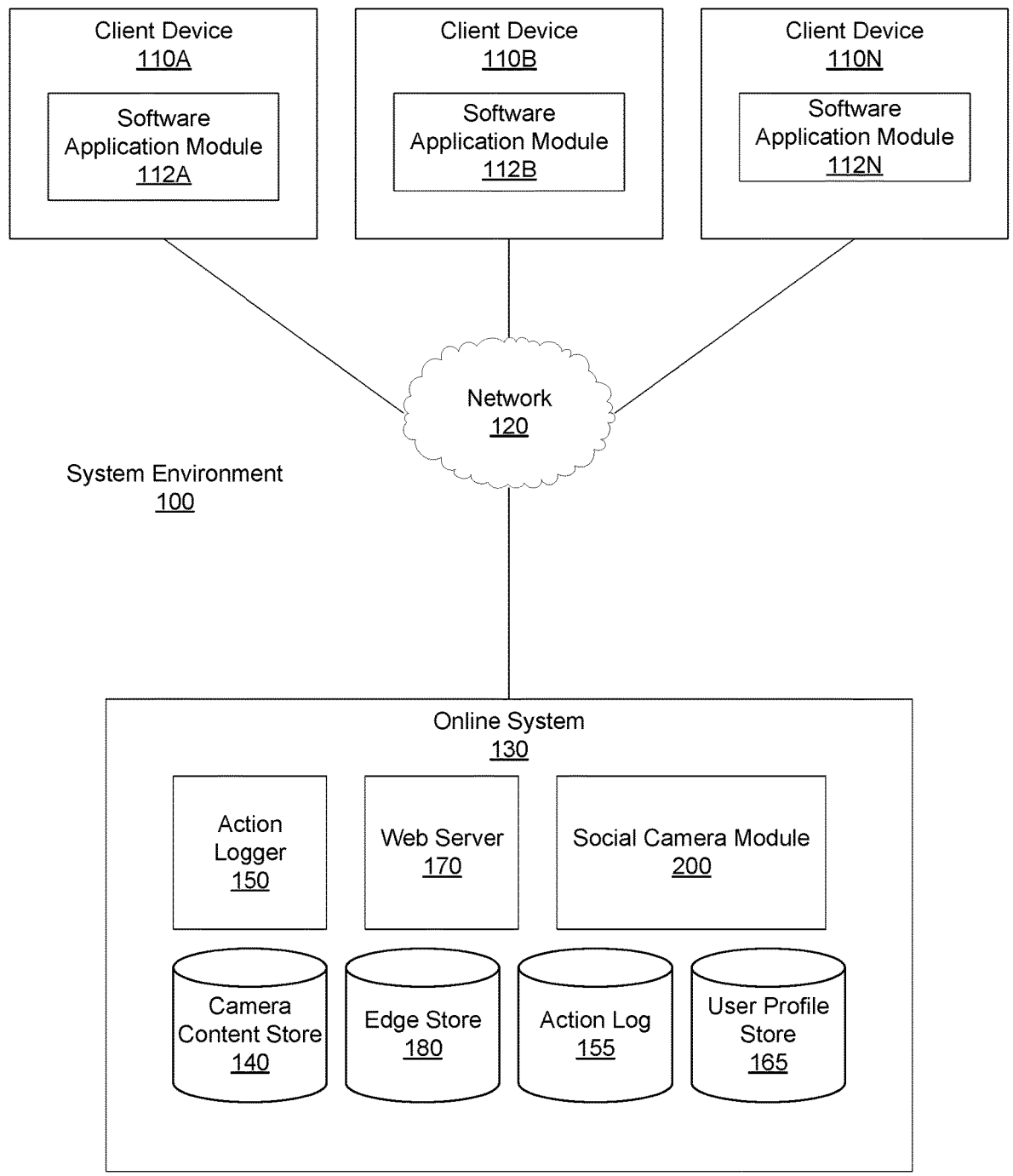
FIG. 1 is a high-level block diagram of a system environment for an online system having a social camera module, according to one embodiment.

FIG. 1 is a block diagram of a system environment 100 for an online system 130 having a social camera module 200. The system environment 100 shown by FIG. 1 comprises one or more client devices 110, a network 120, one or more software application modules 112 executing on the client devices 110, and the online system 130. In alternative configurations, different and/or additional components may be included in the system environment 100. For example, the online system 130 is a social networking system, a content sharing network, a messaging server, or another system providing content to users of the online system 130.

The client device 110 is a computing device capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smart watch, or another suitable device. A client device 110 is configured to communicate with other network entities via the network 120. In one embodiment, a client device 110 executes an application allowing a user of the client device 110 to interact with the online system 130. For example, a client device 110 executes a browser application to enable interaction between the client device 110 and the online system 130 via the network 120. In another embodiment, a client device 110 interacts with the online system 130 through an application programming interface (API) running on a native operating system of the client device 110, such as IOS® or ANDROID™.

In yet another embodiment, a client device 110 executes a software application module 112 on the client device 110 to provide media content captured by a camera of the client device 110 to the social camera module 200 of the online system 130 to generate social camera media content of an event. The software application module 112 of a client device 110 is further described below in conjunction with FIG. 3.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Figure 2:
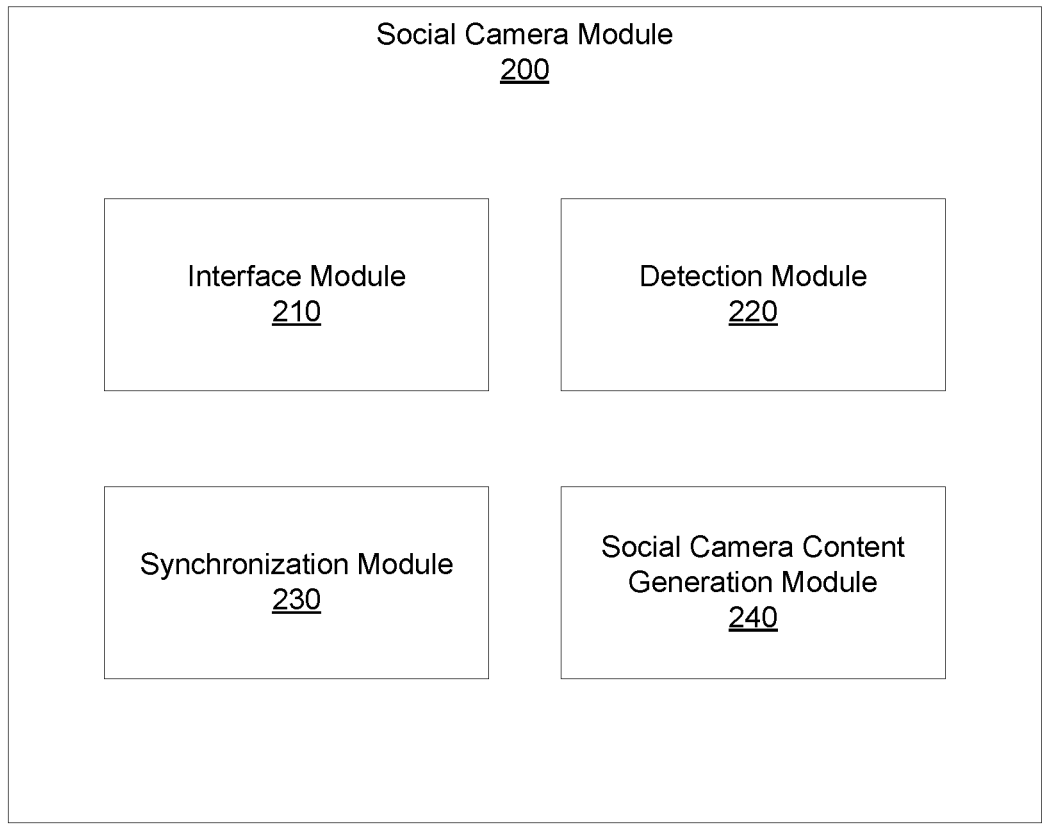
FIG. 2 is an example block diagram of the social camera module, according to one embodiment.

One or more third party systems may be coupled to the network 120 for communicating with the online system 130, which is further described below in conjunction with FIG. 2. In one embodiment, a third party system is an application provider communicating information describing applications for execution by a client device 110 or communicating data to client devices 110 for use by an application executing on the client device 110. In other embodiments, a third party system provides content or other information for presentation via a client device 110. A third party system may also communicate information to the online system 130, such as advertisements, content, or information about an application provided by the third party system. Each third party system is associated with a server outside of the domain of the online system 130. In one embodiment, the third party system communicates content (e.g., a website or HTML code) from a server of the third party system to a server of the online system 130. The content may be created by the entity that owns the third party system. Such an entity may be a company or other type of organization offering a product (e.g., a tangible object or an intangible service), or message that the company wishes to promote.

The online system 130 maintains connections among users belonging to it. These users post media content to the online system and share this content with other connected users. Using the social camera allows connected users to collaborate to create a media item capturing an event that all these connected users previously attended.

The online system 130 receives multiple media content items of a media event, e.g., video streams of a live concert, from a group of users of the online system 130, and generates a high quality video stream of the media event from the received multiple media content items of the media event. In the embodiment shown in FIG. 1, the online system 130 includes an action logger 150, a web server 170, a social camera module 200, a camera content store, 140, an edge store 180, an action log 155 and a user profile store 165. In other embodiments, the online system 130 may include additional, fewer, or different components for various applications. Conventional components such as network interfaces, security functions, load balancers, failover servers, management and network operations consoles, and the like are not shown so as to not obscure the details of the system architecture.

The user profile store 165 stores user profiles associated with each user of the online system 130. A user profile includes declarative information about the user that was explicitly shared by the user and may also include profile information inferred by the online system 130. In one embodiment, a user profile includes multiple data fields, each describing one or more attributes of the corresponding user of the online system 130. Examples of information stored in a user profile include biographic, demographic, and other types of descriptive information, such as work experience, educational history, gender, hobbies or preferences, location and the like.

A user profile may also store other information provided by the user, for example, images or videos. In certain embodiments, images of users may be tagged with identification information of users of the online system 130 displayed in an image. A user profile in the user profile store 165 may also maintain references to actions by the corresponding user performed on the online system 130. The user profile store 165 further stores data describing one or more relationships between different users and allows users to specify their relationships with other users. For example, these user-defined relationships allow users to generate relationships with other users that parallel the user's real-life relationships, such as friends, co-workers, partners, and the like.

While user profiles in the user profile store 165 are frequently associated with individuals, allowing individuals to interact with each other via the online system 130, user profiles may also be stored for entities such as businesses or organizations. This allows an entity to establish a presence on the online system 130 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The camera content store 140 stores objects that each represents a media content item captured by a camera on a user's client device and provided to the online system 130. Examples of content represented by an object include a photograph and a video of a media event such as a live concert. In one embodiment, an object in the content store 140 represent a single piece of content, e.g., a video stream of the media event captured by a camera on a client device 110 associated with a user of the online system 130. Hence, users of the online system 130 are encouraged to communicate with each other by posting content items of various types of media through various communication channels. This increases the amount of interaction of users with each other and increases the frequency with which users interact within the online system 130.

The action logger 150 receives communications about user actions internal to and/or external to the online system 130, populating the action log 155 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 155.

The action log 155 may be used by the online system 130 to track user actions on the online system 130, as well as actions on third party systems that communicate information to the online system 130. Users may interact with various objects on the online system 130, and information describing these interactions is stored in the action log 155. Examples of interactions with objects include: sharing a video stream of a media event, commenting on posts, sharing links, and checking-in to physical locations via a mobile device, accessing content items, and any other interactions. Additional examples of interactions with objects on the online system 130 that are included in the action log 155 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 155 may record a user's interactions with advertisements on the online system 130 as well as with other applications operating on the online system 130. In some embodiments, data from the action log 155 is used to infer interests or preferences of a user, augmenting the interests included in the user's user profile and allowing a more complete understanding of user preferences.

The action log 155 may also store user actions taken on a third party system, such as an external website, and communicated to the online system 130. For example, an e-commerce website that primarily sells sporting equipment at bargain prices may recognize a user of an online system 130 through a social plug-in enabling the e-commerce website to identify the user of the online system 130. Because users of the online system 130 are uniquely identifiable, e-commerce websites, such as this sporting equipment retailer, may communicate information about a user's actions outside of the online system 130 to the online system 130 for association with the user. Hence, the action log 155 may record information about actions users perform on a third party system, including webpage viewing histories, advertisements that were engaged, purchases made, and other patterns from shopping and buying.

In one embodiment, an edge store 180 stores information describing connections between users and other objects on the online system 130 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 130, such as capturing a video stream of a media event using a camera of a user's client device, expressing interest in a page on the social networking system, sharing a link with other users of the social networking system, and commenting on posts made by other users of the social networking system. Users and objects within the social networking system can be represented as nodes in a social graph that are connected by edges stored in the edge store.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 130, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 180 also stores information about edges, such as affinity scores for objects, interests, and other users. Affinity scores, or "affinities," may be computed by the online system 130 over time to approximate a user's affinity for an object, interest, and other users in the online system 130 based on the actions performed by the user. A user's affinity may be computed by the online system 130 over time to approximate a user's affinity for an object, interest, and other users in the online system 130 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 180, in one embodiment. Alternatively, each interaction between a user and a specific object is stored as a separate edge. In some embodiments, connections between users may be stored in the user profile store 165, or the user profile store 165 may access the edge store 180 to determine connections between users.

The web server 170 links the online system 130 via the network 120 to the one or more client devices 110 and/or third party systems. The web server 170 serves web pages, as well as other web-related content, such as JAVA®, FLASH®, XML and so forth. The web server 170 may receive and route messages between the online system 130 and the client device 110, for example, instant messages, queued messages (e.g., email), text messages, short message service (SMS) messages, or messages sent using any other suitable messaging technique. A user may send a request to the web server 170 to upload information (e.g., images or videos) that are stored in the camera content store 140. Additionally, the web server 170 may provide application programming interface (API) functionality to send data directly to native client device operating systems, such as IOS®, ANDROID™, WEBOS® or RIM®.

The online system 130 and the client device 110 cooperatively and/or individually maintain and enforce one or more privacy settings for users of the online system 130 and camera applications in various embodiments. A privacy setting of a user determines how particular information associated with a user can be shared and may be stored. In some embodiments, the client device 110 retrieves privacy settings for one or more users maintained by the online system 130. In one embodiment, a privacy setting specifies particular information associated with a user and identifies other entities with whom the specified information may be shared. Examples of entities with which information can be shared may include other users, applications, third party systems 130 or any entity that can potentially access the information. Examples of information that can be shared by a user include image data, audio data, and video data captured by the user's camera and/or client device 110 and/or data that includes the user. Users may select what data and information they want to share and with whom they want to share. Users may also opt to not share any data or information at all.

More specifically, privacy settings may allow a first user to specify (e.g., by opting out, by not opting in) whether the online system 130 may receive, collect, log, or store particular objects or information associated with the user for any purpose. In particular embodiments, privacy settings may allow the first user to specify whether particular video capture devices, audio capture devices, applications or processes may access, store, or use particular objects or information associated with the user. The privacy settings may allow the first user to opt in or opt out of having objects or information accessed, stored, or used by specific devices, applications or processes. The online system 130 may access such information in order to provide a particular function or service to the first user, without the online system 130 having access to that information for any other purposes. Before accessing, storing, or using such objects or information, the online system may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the online system 130.

The privacy settings maintained and enforced by the online system 130 and/or the client device 110 may be associated with default settings. For example, the online system 130 may maintain a default privacy setting preventing an application from sharing or uploading any data or information to the online system 130 or to other users. The default privacy setting may control any captured video data, audio data, image data, or other data so that the users may select whether to allow their camera and/or mobile devices to share information with the online system 130 and/or any other users and also select with whom their data and information should be shared. A privacy setting associated with a user may have a default setting preventing data captured by a camera from transmitting out of the client device 110. As such, the client device 110 does not transmit or upload the data unless the user affirmatively chooses to authorize such transfer. In some embodiments, the client device 110 prompts a person to provide privacy settings when a software application related to the online system is first installed and/or first used. The application may also prompt additional selection dialogues and/or warnings when a social camera is initiated.

In various embodiments, for the online system 130 and/or various components client device 110 that have functionalities that may allow users to share use of their cameras for jointly capturing a scene or an event, a user may opt to make use of these functionalities to enhance their experience. As an example and not by way of limitation, a user may voluntarily authorize the use and sharing of their cameras. The user's privacy settings may specify that such information may be used only for particular processes, such as only for the joint creation of a social camera media content, and further specify that such information may not be shared with any third-party or used for other processes or applications associated with the online system 130. As another example and not by way of limitation, the online system 130 may share captured image and data for the sole purpose of the joint creation of the social camera media content. If a user wishes to utilize this function, the user may authorize the sharing of the camera on a per-occasion basis and/or for a user-selected limited period of time. Unless the user authorizes otherwise, the data captured through the camera may be used by the online system 130 only to create the social camera media content. In some embodiments, the data captured by a particular user may be anonymized before the data is shared with the online system 130 to create the social camera media content. In addition, a user may select to share only a particular type of data and decide how the data should be shared. For example, the user may decide to share only video data captured by the camera but not the audio data. The user may also decide to share video data of a particular angle or a particular scene. In some cases, the user's privacy setting may also filter any user audio that may include private conversation.

Users may authorize the capture of data, sharing of data and/or cross-application use of any data in one or more ways. For example, user may pre-select various privacy settings before the users use the features of the client devices 110 and/or take actions in the online system 130. In another case, a selection dialogue may be prompted when users first carry out an action or use a feature of the client devices 110 and/or the online system 130 and/or when users have not carried out the action or used the feature for a predetermined period of time. For example, the client device 110 may ask the user to select whether to participate in a social camera media content creation event when such an event is available. The participation of the event is voluntary and is based on user's affirmatively selection in response to an invitation, a user search, or other suitable ways that allow user to discovery the availability of such event. The user may also be informed regarding what data will be shared and how the camera is used when the user has decided to participate in the event to jointly create the media content. During the sharing of the camera, a sign or a warning may also be prominently displayed at the client device 110 so that the user is constantly informed of the camera is being used as a shared mode. The user may further be informed regarding the possibility that the data captured through the user's camera may be fully integrated in the social camera media content and may not be removed once the media content is shared among other users. In one embodiment, the client devices 110 and the online system 130 may also provide notifications to the users when certain features that use or share user data begin to operate or are disabled due to users' selections to allow users to make further selections through the notifications. Other suitable ways for users to make authorizations and to provide user notifications are also possible.

Social Camera Media Content

The social camera module 200 of the online system 130 generates a high quality video stream of an event (e.g., a live concert) based on multiple captures of the event by the aggregate of the multiple user-authorized cameras of client devices 110 associated with a group of users of the online system 130. The high quality video is referred to as "social camera media content." The social camera may also be referred to as combined cameras. The multiple cameras associated with the group of users who provides a capture of the event from a social camera of the social camera media content. The social camera media content is stored as a media file, which describes media content of the event. FIG. 2 shows an embodiment of the social camera module 200, which includes an interface module 210, a detection module 220, a synchronization module 230 and a social camera content generation module 240. Other embodiments of the social camera module 200 may include additional, fewer, or different components for various applications.

The interface module 210 facilitates communications between the client devices 110 and the online system 130. Based on users' authorization, it receives data uploaded from the client devices 110, such as video streams of an event captured by cameras of the client devices 110 associated with a group of users who were present at the event. Examples of the uploaded data from a client device 110 include an identifier of the client device 110 (e.g., device identification provided by the manufacturer of the client device 110, a device universally unique identifier (UUID), a public Internet Protocol address (IP address), private IP address, a media access control address (MAC address), or any other suitable identifier identifying the client device 110, whose camera captures a portion of or entire event) and an identifier of the user of the client device 110 (e.g., the user's identification (ID) on the online system 130).

In one embodiment, based on users' authorization in their privacy setting, the uploaded data also includes media data captured by the cameras (e.g., video streams of a live concert) on the client devices 110. The media data captured by each camera on a client device 110 is stored in the camera content store 140 with corresponding metadata such as a timestamp showing when the capture took place, an identifier of the client device 110, the user ID, resolution of each video stream, zoom levels and focal depths of each camera used for capturing a uploaded video stream, and location information of the event (e.g., global positioning system (GPS) location).

The detection module 220 detects a group of users in the same or near the same physical location of an event that is captured by the cameras of the client devices associated with the group of users. In one embodiment, the users in the group are socially connected with each other within the online system 130, and one of the users in the group is identified as a target user for the social camera media content of the event to be generated. For example, the target user is a user of the group who is the first to send a request for the social camera media content of the event. In this context, "socially connected" means that there is an edge between the target user and each other user of the group. In one embodiment, the detection module 220 determines whether a user of the group is in the vicinity of a target user based on the communication either directly between the client device 110 associated with the user and the client device 110 associated with the target user or through the interface module 210 of the social camera module 200. For example, the communication between the user of the group and the target user can be used to derive the GPS locations of the two users, which indicates whether the two users are in the vicinity of each other.

When the detection module 220 detects another client device 110 in a physical location near the client device 110 of the target user, the detection module 220 obtains the identifier of the another client device 110, and searches the user profile store 165 to find the identification of the user associated with the another client device 110 on the online system 130. The detection module 220 further searches the edge store 180 in the online system 130 to determine whether the two users are socially connected. After a determination that the two users are socially connected, the detection module 220 instructs the interface module 210 to send an invitation on behalf of the target user to each client device 110 of the users that are socially connected to the target user to join the target user's social camera experience. When the other users agree to join, the other users can begin capturing the event using the cameras on their client devices 110 upon a command or a signal of start from the target user or from the interface module 210. The captured data by the camera of the target user's client device 110 and by the cameras of the other users' client devices 110 are uploaded to the social camera module 200 for storing in the camera content store 140 and for further processing by the synchronization module 230 and by the social camera content generation module 240.

The synchronization module 230 receives the media data of the event, e.g., video streams of the event, from the client devices of the group of users including the target user, and synchronizes the received media data. In one embodiment, the synchronization module 230 temporally synchronizes the media data received from the multiple cameras. For example, if the media data is video streams of the event, the synchronization module 230 reads the metadata of each video stream to find timing information, e.g., starting time and ending time of each video stream captured by a camera of client device. The synchronization module 230 chooses a starting point for the synchronization, e.g., the latest starting time among the captured video streams of the event. All video content beginning before the selected starting time captured by a camera of the client device is removed because one or more cameras of the client devices may not capture corresponding portion of the event. Similarly, the synchronization module 230 finds the endpoint of the social camera media content during the synchronization process. For example, the earliest ending time among the captured video streams is used as the endpoint of the social camera media content, and data received after that end time is removed.

The synchronization module 230 also identifies one or more overlaps among the captured video streams by different cameras of the client devices 110. For example, the synchronization module 230 compares the timing information associated with the captured video stream and identifies any video stream that does not overlap with at least one another video stream. In embodiment, the synchronization module 230 removes a video stream that does not overlap with any other captured video streams of the event from the social camera content generation.

The social camera content generation module 240 receives the synchronized video streams of the media event and generates one or more social camera media content items of the media event. In one embodiment, the social camera content generation module 240 generates a social camera media content item of the media event in multiple stages. An example of a first stage is to analyze the metadata associated with each received video stream of the event, including zoom level, focal depth, and view angle of a camera that captured a video stream of the event.

At next stage, the social camera content generation module 240 further processes the received media data of the event by detecting noises and removing the detected noises in the received media data. For example, a video stream of the event captured by a mobile phone held by a user who has a shaky hand can have blurry video frames or other visual artifacts in the video frames. The social camera content generation module 240 applies one or more image processing techniques, such as vector quantizer encoder distortion detection, to the video frames of a captured video stream to detect a blurry video frame. Upon detection of a blurry video frame, the synchronization module 230 removes the blurry image from the video stream or replaces the blurry image with a temporally adjacent video frame that does not have visual artifacts.

The social camera content generation module 240 generates one or more social camera content items of the media event based on the analysis of the metadata of each video stream and noise deduction/removal from each video stream. In one embodiment, the social camera content generation module 240 selects a video stream captured by a camera of a client device as a base video stream of the social camera content item and enhances the base video stream by selecting desirable visual features from other video streams of the event captured by other camera. In one embodiment, the social camera content generation module 240 selects the video stream captured by a camera that has the highest resolution among the cameras that have captured the media event. A higher resolution of a video generally indicates a better visual quality of the the video. In another embodiment, the social camera content generation module 240 selects the video stream captured by the camera of the client device associated with the target user as the base videos stream.

The social camera content generation module 240 enhances the selected based video stream of the event by selecting other video streams or portions of the other video streams that have desirable visual features, such as better resolution, dynamic range of view, better focus of the camera, higher frame rate, and freshness of the video stream based on timing information. In one embodiment, the social camera content generation module 240 generates a multi-angle video stream of the media event by combining different video streams captured at different angles of the media event. The generated multi-angle video stream of the event has a panoramic view of the event without using an expensive 360-degree camera. The social camera content generation module 240 stores the generated social camera content item of the event in the camera content store 140 and instructs the interface module 210 to provide the generated the social camera content item to the target user or the entire group of users whose cameras participated in capturing the video streams of the media event.

Figure 3:
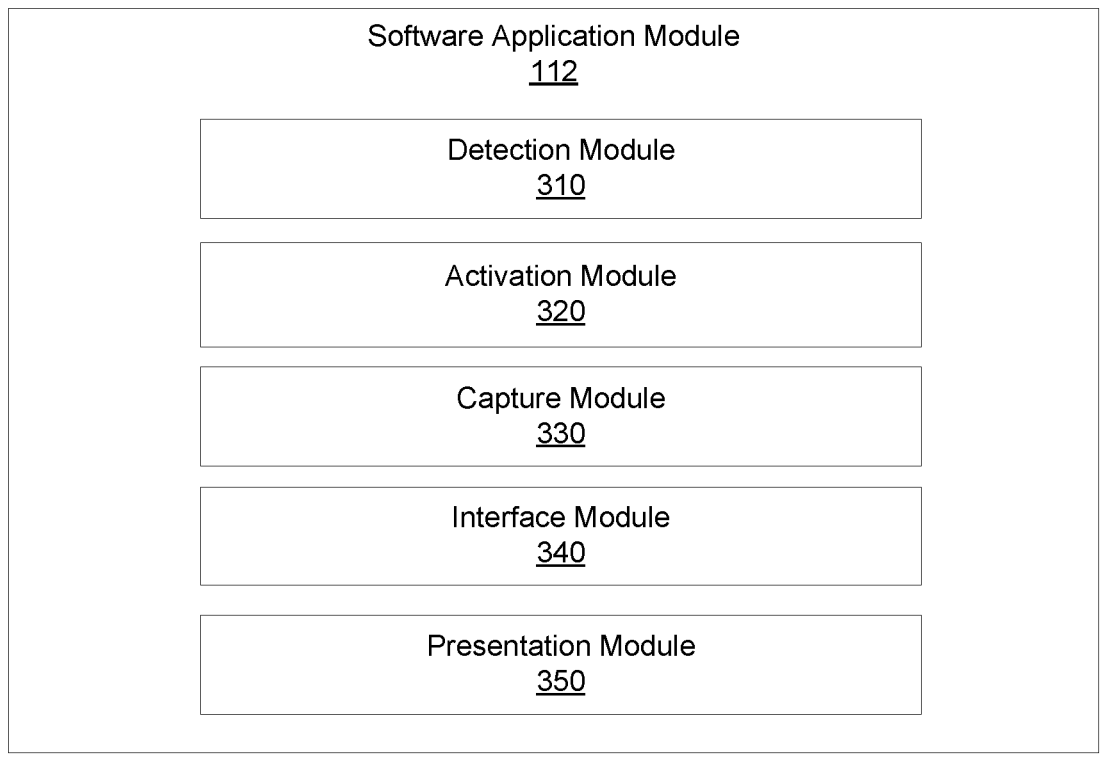
FIG. 3 is an example block diagram of a software application module executing on a client device, according to one embodiment.

In one embodiment, a client device 110 executes a software application module 112, allowing a user of the user device 112 to interact with the online system 130 for social camera content experiences. FIG. 3 shows a block diagram of a software application module 112 on each client device 110. The software application module 112 contains a detection module 310, an activation module 320, a capture module 330, an interface module 340 and a presentation module 350. Other embodiments of the software application module 112 may have different, additional or less modules than the embodiment shown in FIG. 3.

The detection module 310 of the client device 110 associated with a target user detects nearby client devices 110 of other users socially connected with the target user. In one embodiment, the nearby client devices 110 are connected with each other and with the target user over the Internet on a wireless network. In one embodiment, when the target user executes the software application module 112 for social camera content of an event, the detection module 310 of the target user detects the nearby client devices based on the signals broadcast by the nearby client devices. In another embodiment, the detection module 310 queries the online system 130 for information of nearby client devices 110 of other users who are socially connected with the target user.

Upon the detection of nearby client devices 110, the activation module 320 of the target user sends an invitation to the detected nearby client devices 110 to form a social camera, which is formed by the cameras of the nearby client devices 110 that accept the invitation from the target user. Similarly, the target user can also receive invitations from other socially connected users who have started social camera experiences of their own. The users of the nearby client devices 110 and the target user form a social camera content experience group, where a social camera content item of an event generated by the group is shared among the users in the social camera content experience group. A user can also join and leave his/her social camera experience groups freely.

When a social camera content experience group has formed, the activation module 320 of the target user sends a signal of start to other users in the group, which instructs the other users to start capturing the event together with the target user. In response to receiving at least one acceptance of the invitation from another user in the group, the activation module 320 of the target user activates the capture module 330 to start capturing the event. In the above example, the social camera experience is terminated when the activation module 320 of the target user to signal other users of the group to stop capturing the event.

The capture module 330 captures a portion or entire event using a camera of the client devices associated with each user in the social camera content experience group. The interface module 340 receives the captured data of the event and uploads the captured data to the social camera module 200 of the online system 130 for further processing. The interface module 340 also receives the media file of the social camera content of the event generated by the social camera module 200 and uploads it to the client device 110 of the target user for viewing and for sharing. The presentation module 350 displays the media file of the social camera content of the event on a display of the target user's client device. The file can be saved locally and shared among the target user's social connections within the online system 130 and/or within third party systems.

Figure 4:
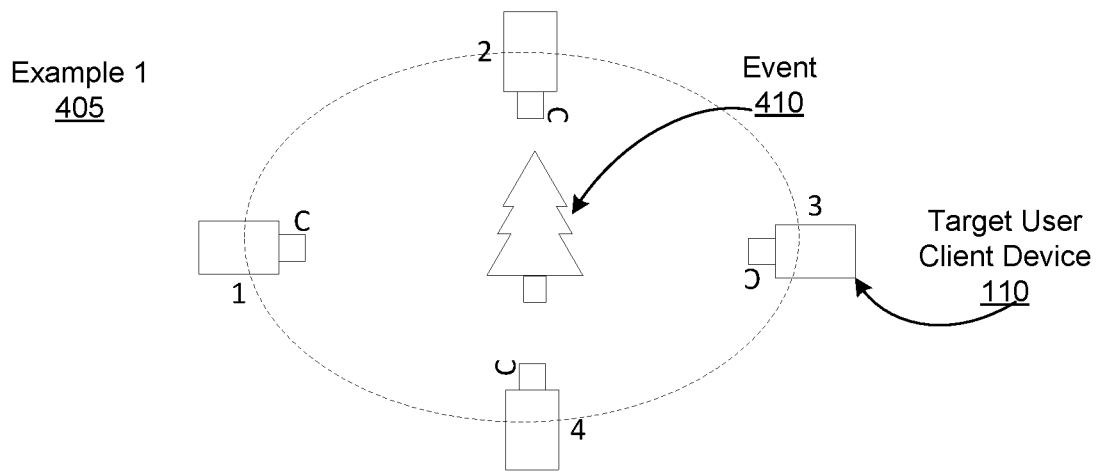
FIG. 4 illustrates two examples of a social camera for capturing an event.
Figure 4:
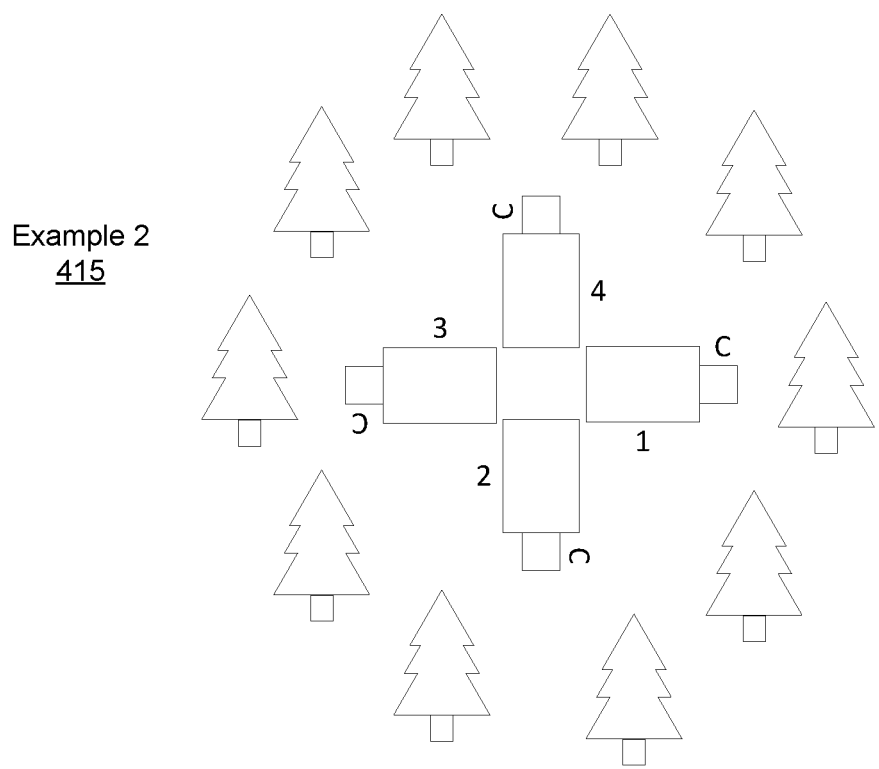

FIG. 4 illustrates two examples of a social camera for capturing an event. In the examples shown in FIG. 4, the event is represented by a tree 410. Four socially connected users are in the vicinity of the event showing by the dashed circle connecting the corresponding cameras of the four users. The four cameras associated with the four users form a social camera. Each of the four users can capture the event from a particular angle and uploads their captures to the social camera module 200 of the online system 130 using the software application modules 112 on their client devices 110. The social camera module 200 can then consolidate these views captured by the social camera and generates a high quality media content item of the event 410, e.g., a multi-view of the event 410, and stores the generated media content item in an output media file. In the example 415, a group of four friends can create a multi-view video of an event 410. These friends can position themselves strategically so that the event can be viewed from every angle. The social camera module 200 creates a 360-degree view of the event 410 by combining multiple captures of the event 410 by the four cameras.

Figure 5:
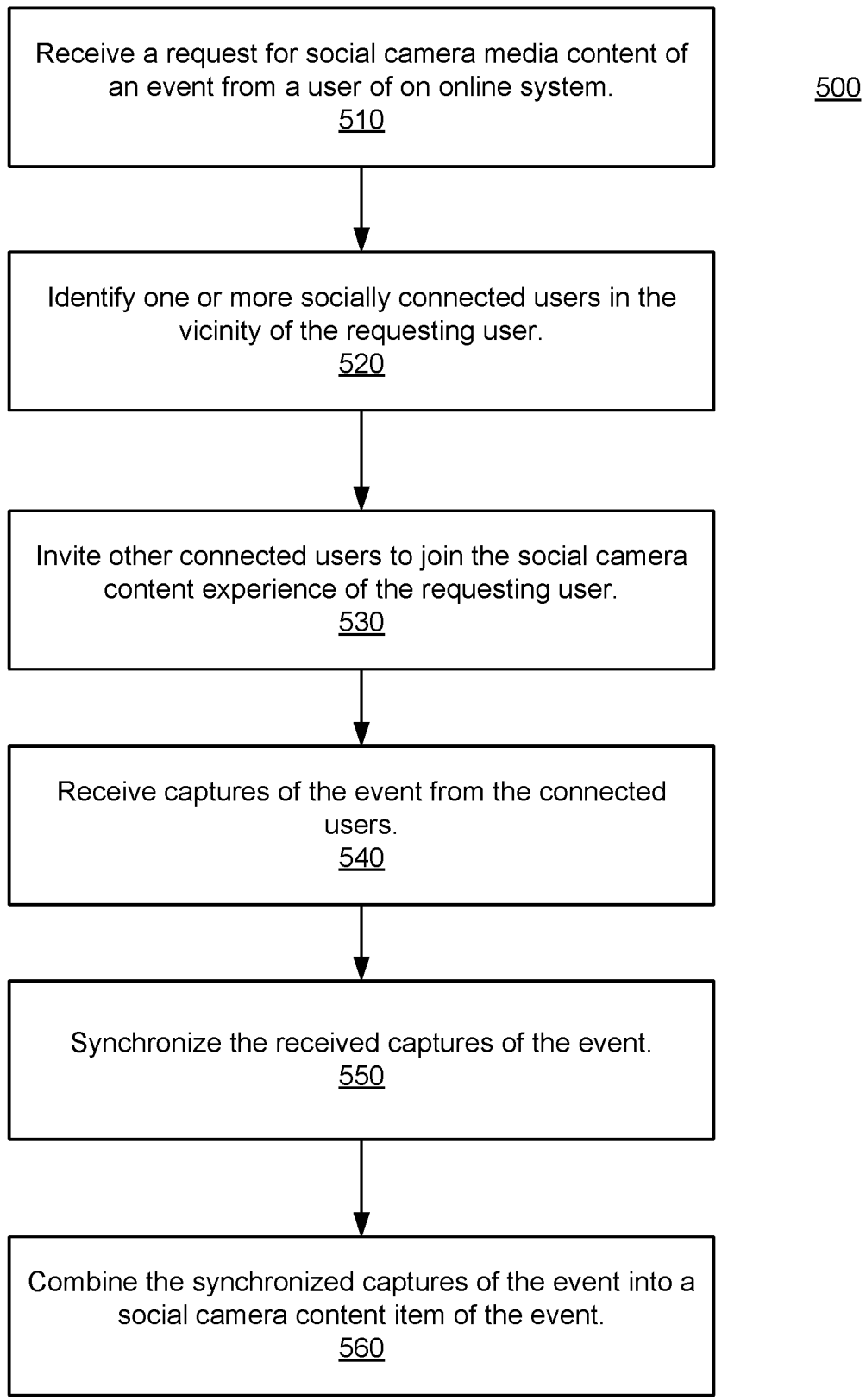
FIG. 5 shows a process of generating a social camera content item by the social camera module, according to one embodiment.

FIG. 5 shows a flow chart of generating a social camera media content item by the social camera module 200 of the online system 130, according to one embodiment. Initially, the social camera module 200 receives 510 a request for social camera media content of an event from a user of the online system 130, and identifies 520 one or more others users of the online system that are in the vicinity of the requesting user. The social camera module 200 determines whether the other users in the vicinity of the requesting user are socially connected, e.g., based on the user profiles. The social camera module 200 invites 530 the other users on behalf of the requesting user to join the requesting user for a social camera content experience. Each of the others users who agrees to participate can capture the same event using cameras of their computing devices, e.g., mobile phones.

The social camera module 200 receives 540 the captures of the event from the other users and synchronizes 550 the received captures, e.g., based on timing information associated with each capture. The social camera module 200 combines 560 the synchronized captures of the event into a social camera media content item of the event, e.g., by selecting a capture of the event from a camera as a base capture and enhancing the base capture with desirable features from other captures. The generated social camera content item has a better quality than a capture of the event by an individual camera of the users in the group. The social camera module 200 provides the generated social camera content item to the requesting user and/or other users in the group for viewing and for sharing.

SUMMARY

The foregoing description of the embodiments of the invention has been presented for the purpose of illustration;

it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving a request for social camera media content of an event from a requesting user of an online system;
   identifying a plurality of client devices associated with one or more socially connected users who are in vicinity of the requesting user, who have accounts in the online system, and whose accounts each has an established social connection with the requesting user's account in the online system;
   transmitting a list of the one or more socially connected users for display at a user interface for the requesting user to select;
   receiving, from the requesting user through the user interface, a selection of socially connected users invited by the requesting user to capture the event concurrently;
   transmitting invitations to the selected other users, the invitations indicating that the requesting user invites the selected socially connected users to capture the event concurrently with the requesting user;
   receiving acceptances from one or more accepted socially connected users, the accepted socially connected users being the selected socially connected users who have accepted the invitations;
   creating a first social camera experience group that captures the event from different views of the accepted socially connected users and the requesting user and shares the views among the accepted socially connected users and the requesting user, creating the first social camera experience group comprising:
      receiving a plurality of captured media contents of the event from the accepted socially connected users and from the requesting user, each captured media content of the event representing a single view of the event,
      synchronizing the captured media contents of the event based on at least timing information of the captured media contents,
      combining the synchronized media contents of the event to generate a social camera media content item of the event, and
      providing the generated social media content item to the requesting user and the accepted users, the generated social media content item including the captured media content from the requesting user;
   creating additional social camera experience groups that captures the event by other users;
   transmitting, for display at the user interface, a list of the additional social camera experience groups that are available for the requesting user to join; and
   providing an option for the requesting user to switch to the one or more additional social camera experience groups.

2. The method of claim 1, wherein identifying the plurality of client devices associated with the one or more socially connected users further comprises:
   determining the identity of the requesting user and the identifies of the one or more socially connected users based on corresponding user profiles of the requesting user and the one or more socially connected users within the online system; and
   determining whether the account of each of the one or more socially connected users has the established social connection with the requesting user's account based on the determined identities.

3. The method of claim 1, wherein synchronizing the captured media content of the event comprises:
   comparing the timing information of each captured media content; and
   selecting a starting time and ending time for the social camera media content item based on the comparison of the timing information.

4. The method of claim 3, wherein creating the first social camera experience group further comprises:

identifying one or more captured media contents capture media content of the event that do not overlap with at least one another captured media content of the event; and removing the identified one or more captured media content of the event from the generation of the social camera media content item of the event.

5. The method of claim 1, wherein combining the synchronized media contents of the event comprises:

identifying one or more visual artifact in a video frame of each captured media content of the event; and removing the identified visual artifact in the video frame.

6. The method of claim 1, wherein combining the synchronized media contents of the event further comprises:

selecting a particular captured media content of the event from a capturing as the social camera media content item with a base visual quality; and enhancing the base visual quality of the social camera media content item of the event with a plurality of desirable features from other captured media contents of the event.

7. The method of claim 6, wherein the plurality of desirable features from the other captured media contents of the event comprise one or more of:

a high resolution of the particular captured media content of the event;

a dynamic range of view the particular captured media content of the event;

a sharp focus of the particular captured media content of the event;

a high frame rate of video frames of the captured media content of the event; or a recent capture of the event.

8. The method of claim 1, wherein each of the plurality of client devices associated with the one or more socially connected users has a digital camera for capturing the event; and the digital cameras of the plurality of client devices form a social camera.

9. The method of claim 1, wherein each of the one or more socially connected users within vicinity of each other can be a requesting user for the social camera content of the event.

10. A non-transitory computer-readable medium comprising computer program instructions, the computer program instructions when executed by a computer processor causes the processor to perform steps comprising:

receiving a request for social camera media content of an event from a requesting user of an online system;

identifying a plurality of client devices associated with one or more socially connected users who are in vicinity of the requesting user, who have accounts in the online system, and whose accounts each has an established social connection with the requesting user's account in the online system;

transmitting a list of the one or more socially connected users for display at a user interface for the requesting user to select;

receiving, from the requesting user through the user interface, a selection of socially connected users invited by the requesting user to capture the event concurrently;

transmitting invitations to the selected other users, the invitations indicating that the requesting user invites the selected socially connected users to capture the event concurrently with the requesting user;

receiving acceptances from one or more accepted socially connected users, the accepted socially connected users being the selected socially connected users who have accepted the invitations;

creating a first social camera experience group that captures the event from different views of the accepted socially connected users and the requesting user and shares the views among the accepted socially connected users and the requesting user, creating the first social camera experience group comprising:

receiving a plurality of captured media contents of the event from the accepted socially connected users and from the requesting user, each captured media content of the event representing a single view of the event, synchronizing the captured media contents of the event based on at least timing information of the captured media contents, combining the synchronized media contents of the event to generate a social camera media content item of the event, and providing the generated social media content item to the requesting user and the accepted users, the generated social media content item including the captured media content from the requesting user;

creating additional social camera experience groups that captures the event by other users;

transmitting, for a display at the user interface, a list of the additional social camera experience groups that are available for the requesting user to join; and providing an option for the requesting user to switch to the one or more additional social camera experience groups.

11. The non-transitory computer-readable medium of claim 10, wherein the instruction for identifying the plurality of client devices associated with the one or more socially connected users further comprises instruction for determining the identity of the requesting user and the identifies of the one or more socially connected users based on corresponding user profiles of the requesting user and the one or more socially connected users within the online system; and determining whether the account of each of the one or more socially connected users has the established social connection with the requesting user's account based on the determined identities.

12. The non-transitory computer-readable medium of claim 10, wherein synchronizing the captured media content of the event comprises:

comparing the timing information of each captured media content; and selecting a starting time and ending time for the social camera media content item based on the comparison of the timing information.

13. The non-transitory computer-readable medium of claim 12, the instruction for creating the first social camera experience group further comprises instructions for:

identifying one or more captured media contents of the event that do not overlap with at least one another captured media content of the event; and removing the identified one or more captured media content of the event from the generation of the social camera media content item of the event.

14. The non-transitory computer-readable medium of claim 10, wherein the instruction for combining the synchronized media contents of the event comprises instructions for:

identifying one or more visual artifact in a video frame of each captured media content of the event; and removing the identified visual artifact in the video frame.

15. The non-transitory computer-readable medium of claim 10, wherein the instruction for combining the synchronized media contents of the event comprises instructions for:

selecting a particular captured media content of the event from a capturing as the social camera media content item with a base visual quality; and enhancing the base visual quality of the social camera media content item of the event with a plurality of desirable features from other captured media contents of the event.

16. The non-transitory computer-readable medium of claim 15, wherein the plurality of desirable features from the other captured media contents of the event comprise one or more of:

a high resolution of the particular captured media content of the event;

a dynamic range of view the particular captured media content of the event;

a sharp focus of the particular captured media content of the event;

a high frame rate of video frames of the captured media content of the event; or a recent capture of the event.

17. The non-transitory computer-readable medium of claim 10, wherein each of the plurality of client devices associated with the one or more socially connected users has a digital camera for capturing the event; and the digital cameras of the plurality of client devices form a social camera.

18. The non-transitory computer-readable medium of claim 10, wherein each of the one or more socially connected users within vicinity of each other can be a requesting user for the social camera content of the event.

19. The method of claim 1, wherein the generated social media content item is provided for display on a page of a social network system.

20. The non-transitory computer-readable medium of claim 10, wherein the generated social media content item is provided for display on a page of a social network system.

* * * * *